Figure 1:
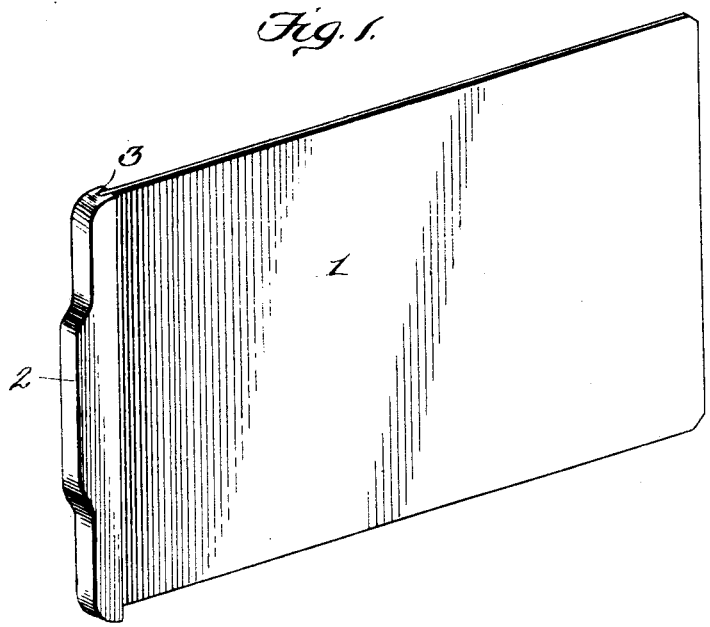

No. 711,347. Patented Oct. 14, 1902.
J. A. ROBERTSON & W. H. WRIGHT.
SLIDE FOR PHOTOGRAPHIC PLATE HOLDERS.
(Application filed May 29, 1902.)

(No Model.) 2 Sheets—Sheet 1.

Witnesses:
C. F. Kesler

Inventors
John A. Robertson
William H. Wright
By James L. Norris
Atty.

No. 711,347. Patented Oct. 14, 1902.
J. A. ROBERTSON & W. H. WRIGHT.
SLIDE FOR PHOTOGRAPHIC PLATE HOLDERS.
(Application filed May 29, 1902.)
(No Model.) 2 Sheets—Sheet 2.
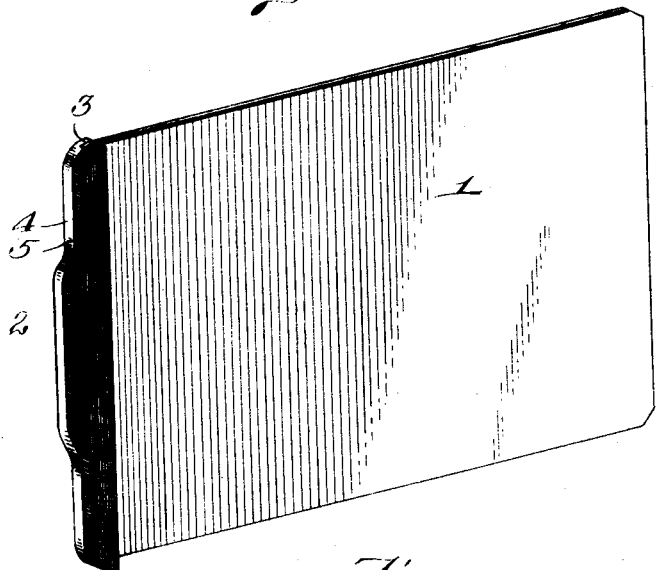
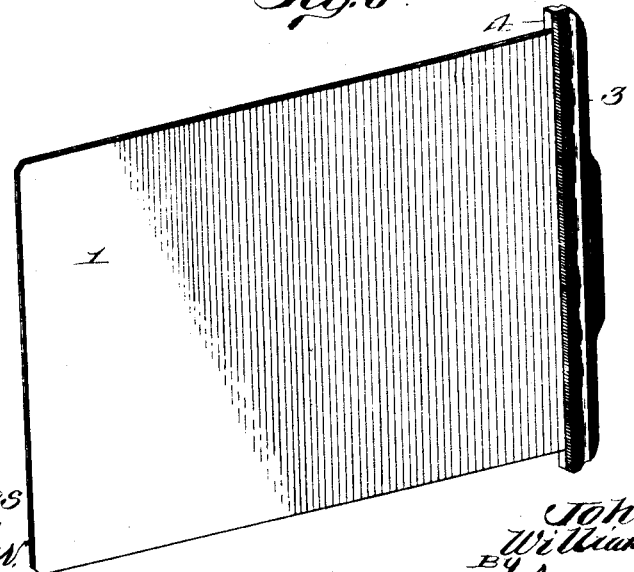

UNITED STATES PATENT OFFICE.

JOHN A. ROBERTSON, OF ROCHESTER, NEW YORK, AND WILLIAM H. WRIGHT, OF AKRON, OHIO, ASSIGNORS TO ROCHESTER OPTICAL & CAMERA CO., OF ROCHESTER, NEW YORK, A CORPORATION OF NEW YORK.

SLIDE FOR PHOTOGRAPHIC-PLATE HOLDERS.

SPECIFICATION forming part of Letters Patent No. 711,347, dated October 14, 1902.

Application filed May 29, 1902. Serial No. 109,551. (No model.)

*To all whom it may concern:*

Be it known that we, JOHN A. ROBERTSON, residing at Rochester, in the county of Monroe and State of New York, and WILLIAM H. WRIGHT, residing at Akron, in the county of Summit and State of Ohio, citizens of the United States, have invented new and useful Improvements in Slides for Photographic-Plate Holders, of which the following is a specification.

This invention relates to slides for photographic-plate holders. Heretofore it has been the usual custom to construct such slides of a rectangular sheet or plate of hard rubber or other suitable material and to attach to one end of such plate a head consisting of a wooden strip that projects beyond both sides or edges of the plate, the purpose of the head being to provide a convenient means for withdrawing the slide from the plate-holder and principally to effectually exclude the light from the plate-holder when the latter is exposed to strong light for any considerable time. Practice has demonstrated that several serious objections are connected with plate-holders constructed in the manner above referred to. Great difficulty has been experienced in attaching wooden heads to the rubber or other plates, owing to the fact that it has been found impossible to find a cement that will firmly and securely attach the wooden head to the rubber or other plate. To overcome this difficulty, recourse has been had to nailing or tacking the wooden head to the plate, the nails or tacks being passed entirely through the head and plate. Such constructions have in practice proven unsatisfactory, because in use the head very often becomes loose and pulls off, especially in view of the fact that in practice the plate is made slightly shorter than the aperture in the plate-holder in which it is fitted, so that the head abuts closely against the end of the plate-holder, and when such a slide is forced quickly into the holder the concussion which is caused by the impact of the head against the end of the holder very frequently strips the head from the plate.

It is the object of the present invention to provide a slide with a novel head, the two forming practically an integral or homogeneous article, in which the slide and head will be practically inseparable and be equally and in like manner affected by changes of temperature and variations in atmospheric conditions.

It has for another object to so construct a head that it may be employed to indicate whether or not the sensitized plate contained in the plate-holder has been exposed.

To these ends our invention consists in a slide for plate-holders constructed in a manner hereinafter described, and particularly pointed out in the claims following the description, reference being had to the accompanying drawings, forming a part of this specification, wherein—

Figure 2:
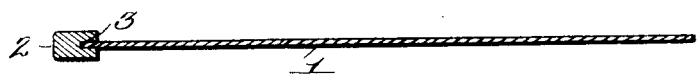
Figure 3:
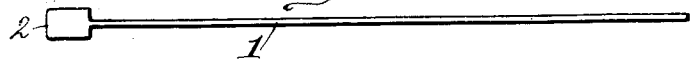

Figure 1 is a perspective view of a slide constructed in accordance with our invention. Fig. 2 is a longitudinal sectional view of the same. Fig. 3 shows the plate and head formed in one piece. Fig. 4 is a perspective view of a modified form of slide. Fig. 5 is a longitudinal sectional view of the same, and Fig. 6 is a perspective view illustrating a slightly-modified form of head.

Referring to the slide shown in Figs. 1 and 2, the numeral 1 indicates the rubber plate forming the body of the slide, as usual, and 2 the head. The head 2 is formed of the same material as the plate 1, preferably of hard rubber, and has formed in one of its edges a longitudinal kerf 3. The kerf 3 is preferably formed approximately of the size of the cross-sectional size of the plate 1. Rubber cement is applied to one end of the plate 1, and the head 2 is heated, so as to expand it. The cemented end of the slide is then inserted in the kerf of the heated head, and when the latter cools it will shrink tightly about the opposite sides of the inserted end of the plate, forming practically a homogeneous mass. Instead of forming the head in one solid piece of rubber we may, as shown in Figs. 4, 5, and 6, form it in two separate correspondingly-shaped strips 4 and 5, said strips and the plate being vulcanized together. Before being vulcanized together a rabbet may be formed in one of the strips—as 5, for example—or both strips may first be formed perfectly rectangular in cross-section and vulcanized together and a kerf afterward cut in one of the edges of the composite head thus formed, or the plate 1 may be affixed to such head in the manner before described—that is to say, one of its ends be coated with a suitable rubber cement, the head heated and then affixed to the end of the plate and allowed to cool, so that it will shrink and tightly embrace the ends of the plate. Instead of shrinking or vulcanizing the slide to the head the two may be molded in a single integral piece, as shown in Fig. 3. The opposite sides of the head in the form of slide shown in Figs. 1, 2, and 3 have applied to them contrasting colors in any suitable way.

In making the composite head of Figs. 4, 5, and 6 we form the two strips of rubber from which the head is made of contrasting colors. For example, the strip 5 will be made of red rubber and the strips 4 of black rubber. By providing contrasting colors for the sides of the head convenient means is provided for indicating whether or not the sensitized plate in the holder has been exposed. For example, when the slide is inserted in the holder to cover the sensitized plate it will be inserted in the holder in such manner that the black side of the head will be outermost or, in other words, will be disposed toward the operator. Thus when the operator views the plate-holder both the plate 1 and the head 2 will appear black, and hence he will know that the plate contained in the holder has not been exposed. After, however, the slide has been withdrawn from the plate-holder to expose the sensitized plate and before reinserting the slide in the plate-holder the slide is reversed, so that after the exposure has been made and the slide is slipped back in place in the plate-holder the red side of the head will be presented to view, thus giving notice that the plate contained in the plate-holder has been exposed and warning the operator not to again withdraw the slide, excepting in the dark room.

In the several forms of the slide shown both the head and the plate are substantially formed in one homogeneous piece of material, making the separation of the head from the plate practically impossible. Moreover, by forming the head and the plate of the same material they will equally and in like manner be affected by changes of temperature and variations in atmospheric conditions, thereby aiding in preventing their separation.

Of the several methods of attaching the head to the slide above referred to that of shrinking the head to the slide is preferred, owing to its inexpensiveness and convenience; but in the broader aspect of our invention we do not wish to be confined to either.

Having described our invention, what we claim is—

1. A slide for plate-holders, consisting of a rubber plate and a rubber head fitted on one end of the plate and constituting therewith a practically homogeneous article.

2. A slide for plate-holders, comprising a rubber plate and two correspondingly-shaped rubber strips arranged on opposite sides of one end of the plate and constituting therewith a practically homogeneous article.

3. A slide for plate-holders, consisting of a rubber plate and two correspondingly-shaped contrastingly-colored rubber strips arranged on opposite sides of one end of the plate, and constituting therewith a practically homogeneous article.

In testimony whereof we have hereunto set our hands, in presence of two subscribing witnesses, at Rochester, New York, and Akron, Ohio, respectively.

JOHN A. ROBERTSON.
W. H. WRIGHT.

Witnesses to signature of John A. Robertson:
ALF. A. RUTTAN,
A. CARL FISHER.

Witnesses to signature of William H. Wright:
CLARENCE E. COOK,
S. H. KOHLER.